Nov. 4, 1924.
Q. BOURLAND
JACK
Filed Sept. 4, 1923
1,513,886
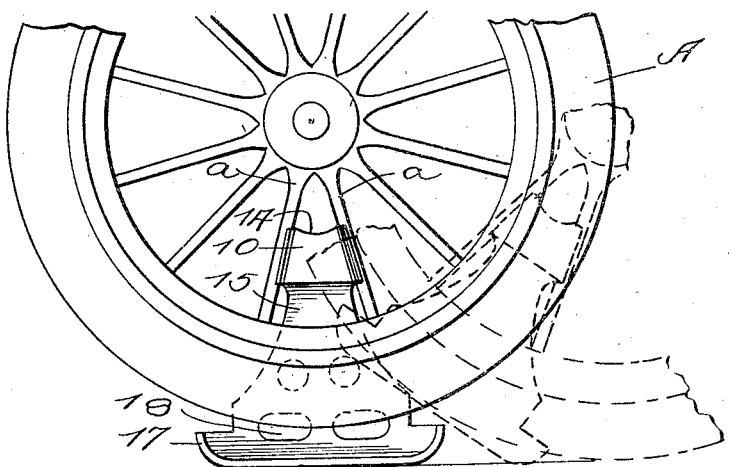
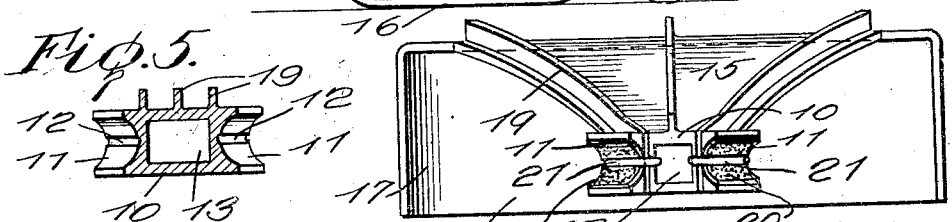
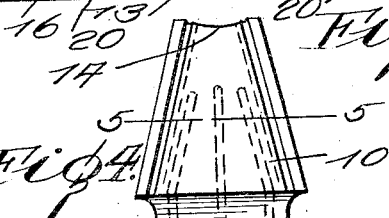
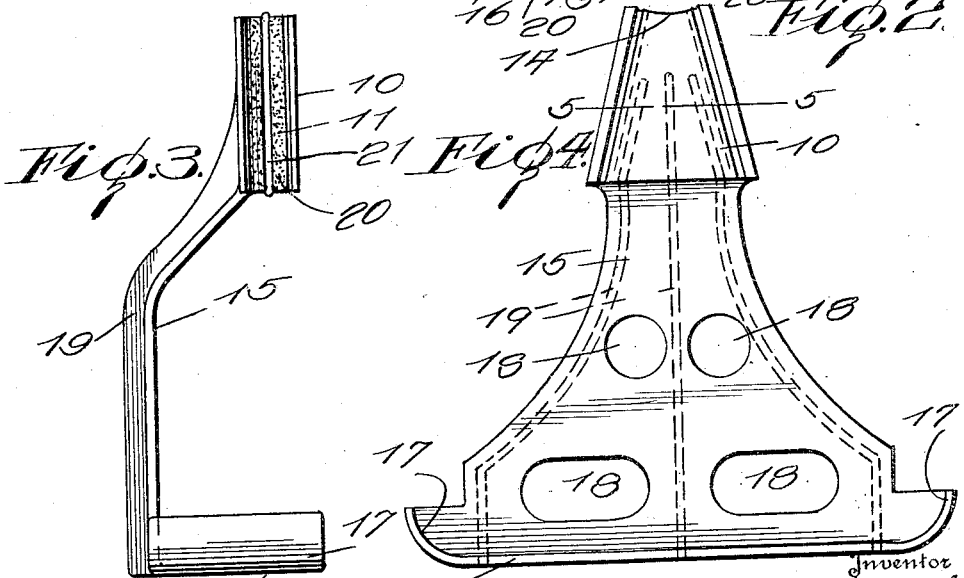
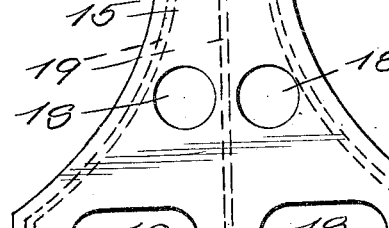
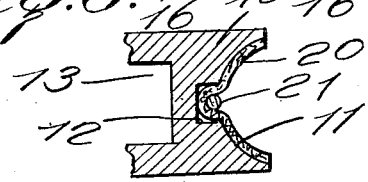
Inventor
Quaile Bourland Patented Nov. 4, 1924.

1,513,886

UNITED STATES PATENT OFFICE.

QUAILE BOURLAND, OF GALION, OHIO, ASSIGNOR TO THE NATIONAL GRAVE VAULT COMPANY, OF GALION, OHIO, A CORPORATION OF OHIO.

JACK.

Application filed September 4, 1923. Serial No. 660,912.

*To all whom it may concern:*

Be it known that I, QUAILE BOURLAND, a citizen of the United States, residing at Galion, in the county of Crawford and State of Ohio, have invented certain new and useful Improvements in Jacks, of which the following is a specification.

This invention relates to wheel jacks for tractors, automobiles and other vehicles, and particularly to that type of jack having means whereby it may be engaged with the spokes of a wheel and which, when so engaged, will project out beyond the rim of the wheel so that when the wheel is turned to carry the jack into engagement with the ground the wheel and the axle will be lifted.

The general object of this invention is to provide a very simply constructed and very solid and strong jack of this character which fits in between the spokes of a wheel at or near to the hub and which does not require any adjunctive devices for the purpose of holding it in engagement with the wheel.

A further object is to provide a jack of this character which requires no adjustment to the wheel but will fit practically every wheel of standard make and which, in addition to acting as a jack, may also be used as a mud lug or "mud hook."

Other objects will appear in the course of the following description.

My invention is illustrated in the accompanying drawings, wherein:—

Figure 1 is a side elevation of an automobile wheel having my improved jack applied thereto;

Figure 2 is a top plan view of the jack;

Figure 3 is an edge elevation of the jack;

Figure 4 is a front elevation of the jack;

Figure 5 is a section on the line 5—5 of Figure 4;

Figure 6 is a fragmentary sectional view through the jack on the same lines as Figure 5 but showing the cushioning pad 20 of the jack.

Referring to these drawings, it will be seen that my jack comprises a somewhat triangular body or head, designated generally 10, which has a width equal to the average width between the spokes of a wheel. This head has upwardly convergent side faces 11, these side faces being transversely concave, and each of these side faces is formed with an upwardly extending or longitudinal medially disposed groove 12. This head or body 10 is cored out at 13 and the upper face 14 of the head is slightly concave. The groove 12 is continued along the upper face of the head and intersects the opening 13.

The concave face 11 is adapted to form a seat for the downwardly divergent spokes *a* of a wheel A, as shown in Figure 1. Cast or otherwise formed integrally with the head 10 is a support or leg 15 which extends downwardly and laterally for a distance and then straight downward. This leg gradually increases in width from its upper end to its lower end and at its lower end is made relatively wide and is formed with a flange 16, which flange in actual practice will be about three and a half inches wide. The ends of the flange are curved upward, as at 17, and this leg or web is formed with apertures 18 to lighten the weight without diminishing the strength.

For the further purpose of increasing the strength of this leg, which is relatively thin, I provide a plurality of ribs 19, these ribs extending downwardly from the head on the outer face thereof and extending along the outer face of the leg 15. The middle rib 19 is disposed entirely in a vertical plane but the lateral ribs follow the contour of the side edges of the leg and extend downward to the extreme lower end of the leg.

It will be seen that when this device is in place the head 10 will be disposed between the spokes *a* of the wheel, the leg will extend laterally with relation to the wheel so as to be disposed interiorly of the felly and wheel rim and tire if one is used, and the tread flange 16 will be disposed immediately beneath the wheel so as to provide an extended bearing or tread surface on the bottom of the jack to afford full support for the wheel.

In the use of this device, it is only necessary to insert the head 10 between the spokes *a* and push it up or toward the center of the wheel slightly and then rotate the wheel either manually or by power, which will bring the flange tread surface against the ground and this will automatically force the head into tight and firm engagement with the spokes and force the head inward as far as it will go, securing binding engagement with the spokes. The head is held on each side by the spokes so that the jack cannot slip or incline from a truly radial position. As the wheel is turned, therefore, it will lift up on the wheel so as to raise the wheel and the axle.

Obviously if two of these jacks are used the vehicle will be raised entirely at its rearward or forward end as desired. If only one of these jaws are used, the vehicle will be tilted. Obviously also this device may be used as a mud lug or hook where the vehicle has become stalled, as in a rut or a mudhole.

Inasmuch as this device is cast in one piece, it obviously may be made very strong and rigid and at the same time relatively cheaply. It does not have to be attached to the wheel by straps, bolts, clamps or other like adjunctive devices but is merely inserted between the spokes and then forced into interlocking engagement with the spokes by the weight of the vehicle. The upper end of the head is concavely curved so that it may fit against the hub of the wheel in case the spokes are sufficiently far apart to permit the head to be disposed at the inner ends of the spokes and closely adjacent the hub. Obviously the nearer the head is to the hub, the more firmly will the wheel be supported.

It is to be noted that the head 10 is formed as an integral part of the leg 15 and that this head is formed of a rear web, lateral webs and a front web defining the opening 13, thus the side webs or walls of the head are not liable to be forced inward and deformed by the downward thrust of the spokes a on the side walls of the head and this permits the head to be removed from between the spokes much easier than would otherwise be and prevents gradual deformation of the head.

While I have illustrated a particular form of this jack, I do not wish to be limited to the exact details as these might be modified in many ways without departing from the spirit of the invention as defined in the appended claims.

It is to be understood that a cushioning pad of felt or like material is preferably disposed against the concave faces 11 and 14, this pad 20 being held in place by means of a wire 21, which wire forces the felt into the groove 12 so that the wire will not mar the spokes. It will be understood that the upper end of the head is slightly concave, as at 14, so that the head may fit up against the hub and thus the head can either fit at the hub or between the spokes without touching the hub.

I claim:—

1. A jack of the character described comprising a head having upwardly converging side faces, the side faces being concave, the head being formed with an integral web extending laterally and downwardly, said web constituting a leg and the lower end of the leg being formed with an integral angularly disposed flange located upon the leg and forming a tread member, the flange being longitudinally curved, the inner face of the flange being formed with a longitudinally extending groove; cushioning material disposed within the concave side faces and fitting the same, a wire holding the cushioning material in place and forcing the cushioning material into said groove whereby the wire is disposed flush with the cushioning material.

2. A jack of the character described comprising a head having upwardly convergent side faces, the side faces being concave and each face having a medial, longitudinally extending channel, the head being formed with an integral web extending laterally and downwardly and then downward from the head, this web gradually increasing in width from its junction with the head to its outer end and having strengthening ribs upon its outer surface, the lower end of the leg being formed with an integral, angularly disposed flange disposed beneath the head and forming a tread member, the flange being curved upward at its ends.

In testimony whereof I affix my signature.

QUAILE BOURLAND.